July 5, 1966 — J. ROSÁN — 3,259,162

INSERT WITH FRICTIONALLY INTERLOCKED LOCKING RING

Filed Feb. 6, 1964 — 5 Sheets-Sheet 1

INVENTOR.
José Rosán
BY
ATTORNEY

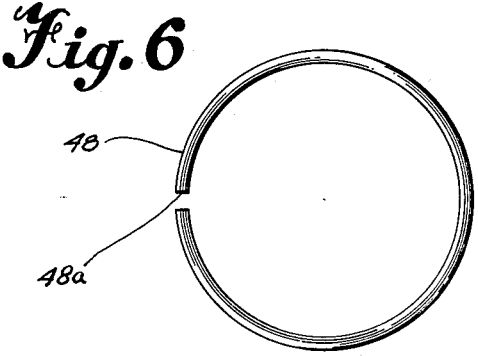
Fig. 6
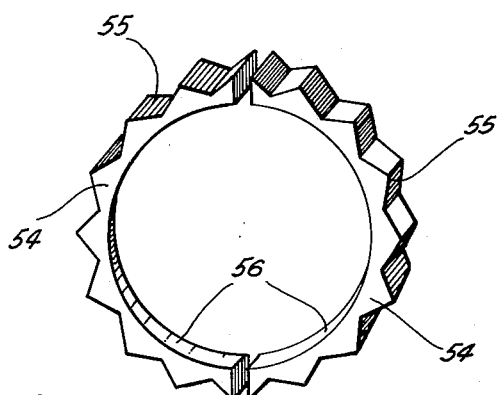
Fig. 9
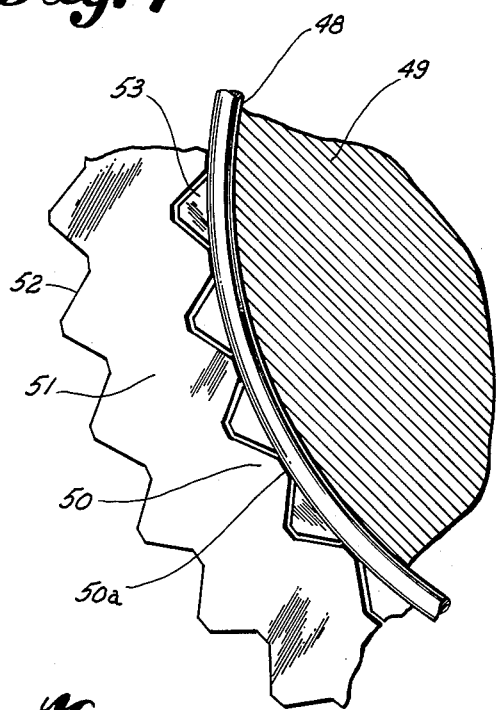
Fig. 7
Fig. 8
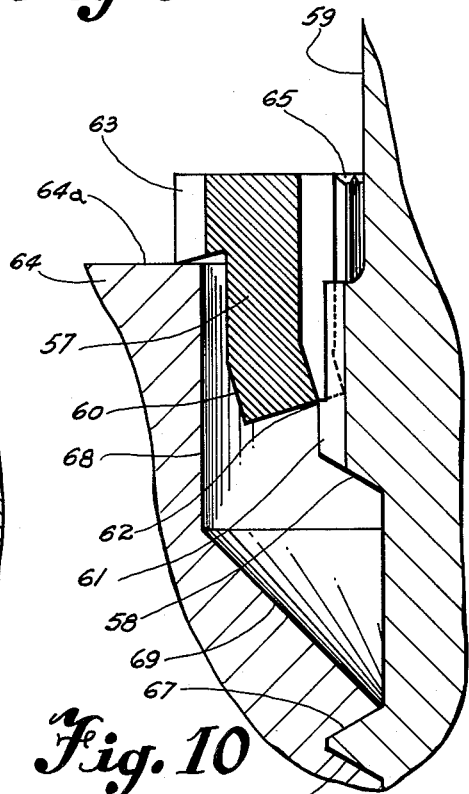
Fig. 10
INVENTOR.
José Rosán
BY
ATTORNEY July 5, 1966  J. ROSÁN  3,259,162
INSERT WITH FRICTIONALLY INTERLOCKED LOCKING RING
Filed Feb. 6, 1964  5 Sheets-Sheet 3
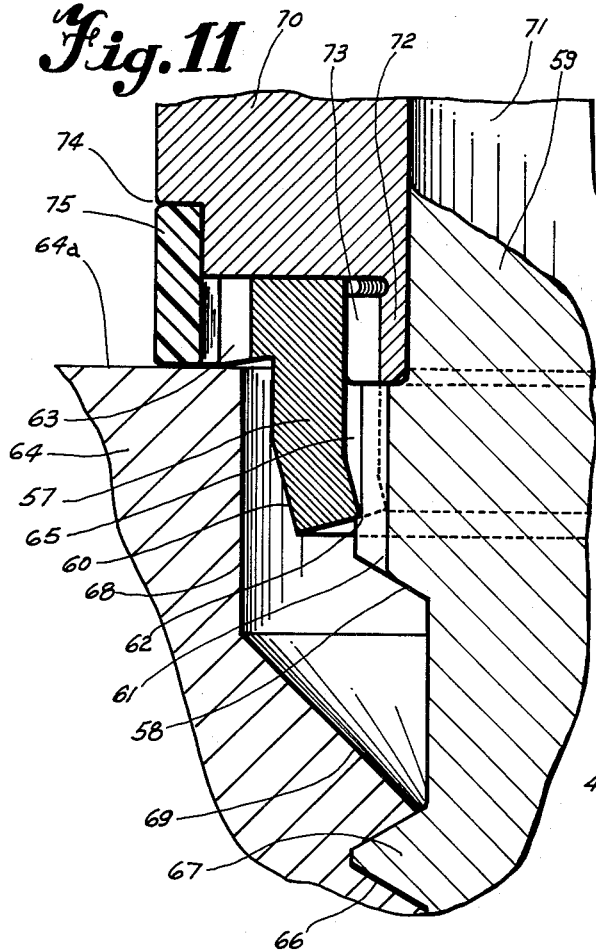
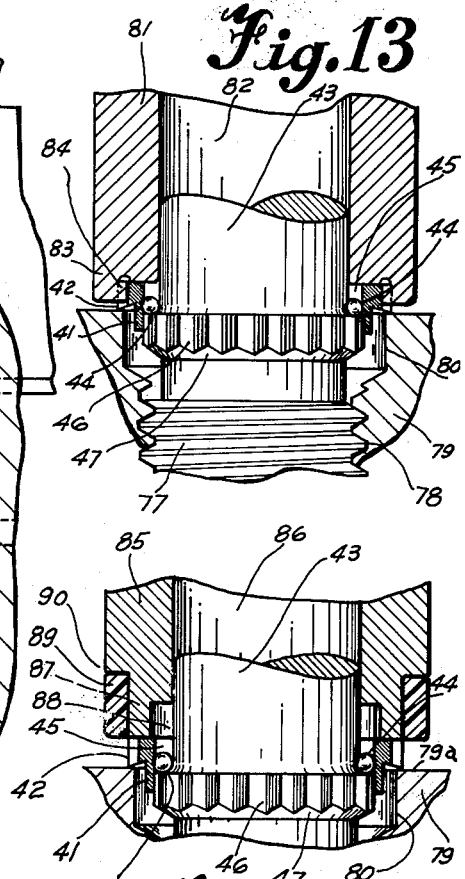
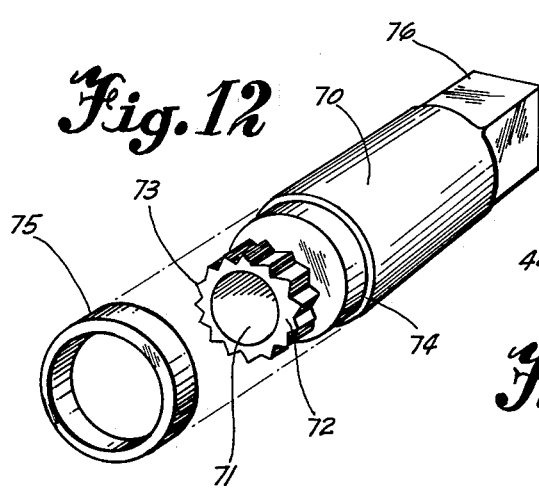
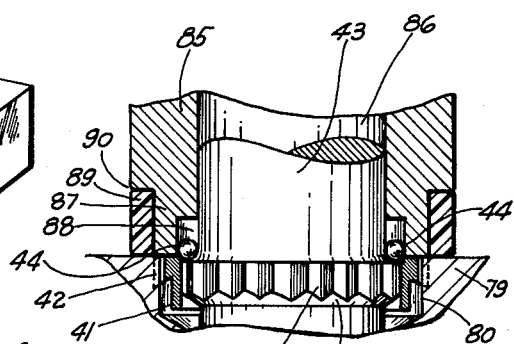
INVENTOR.
José Rosán
BY
ATTORNEY

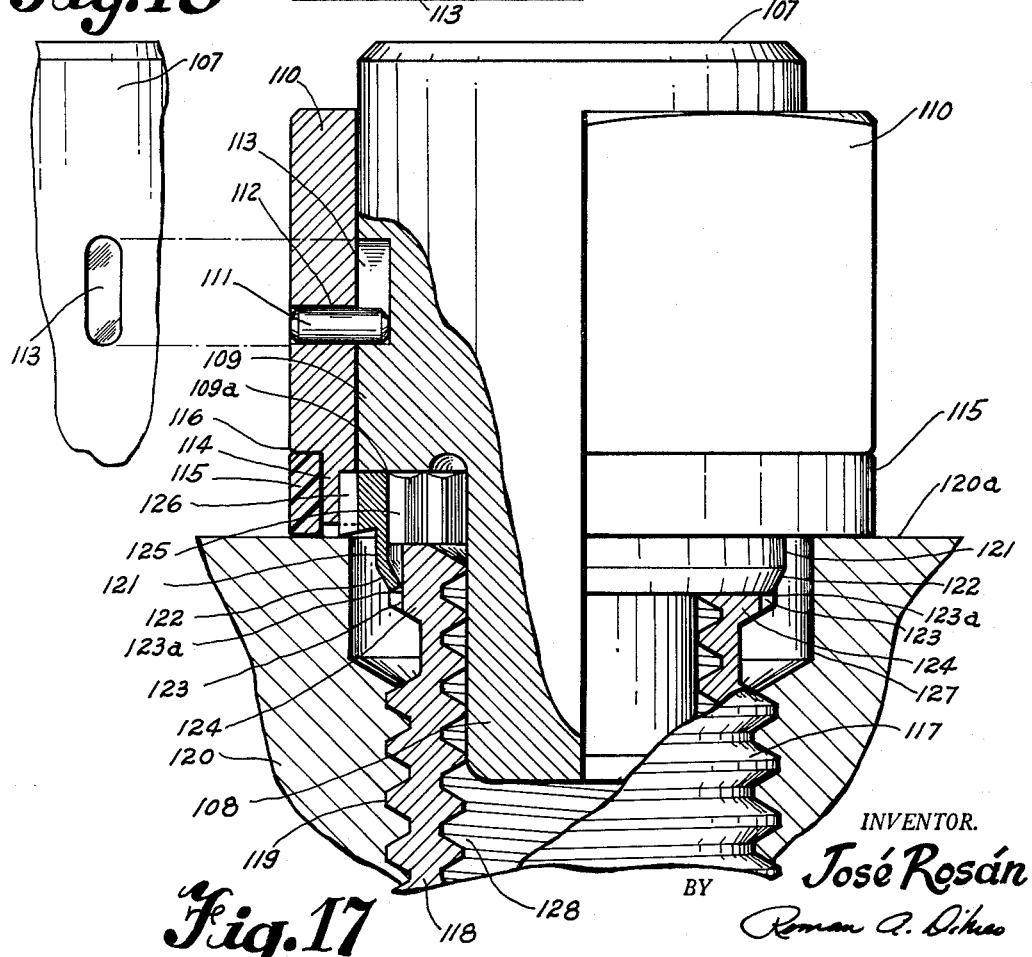

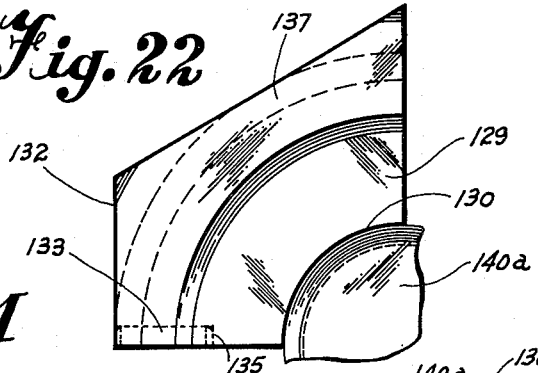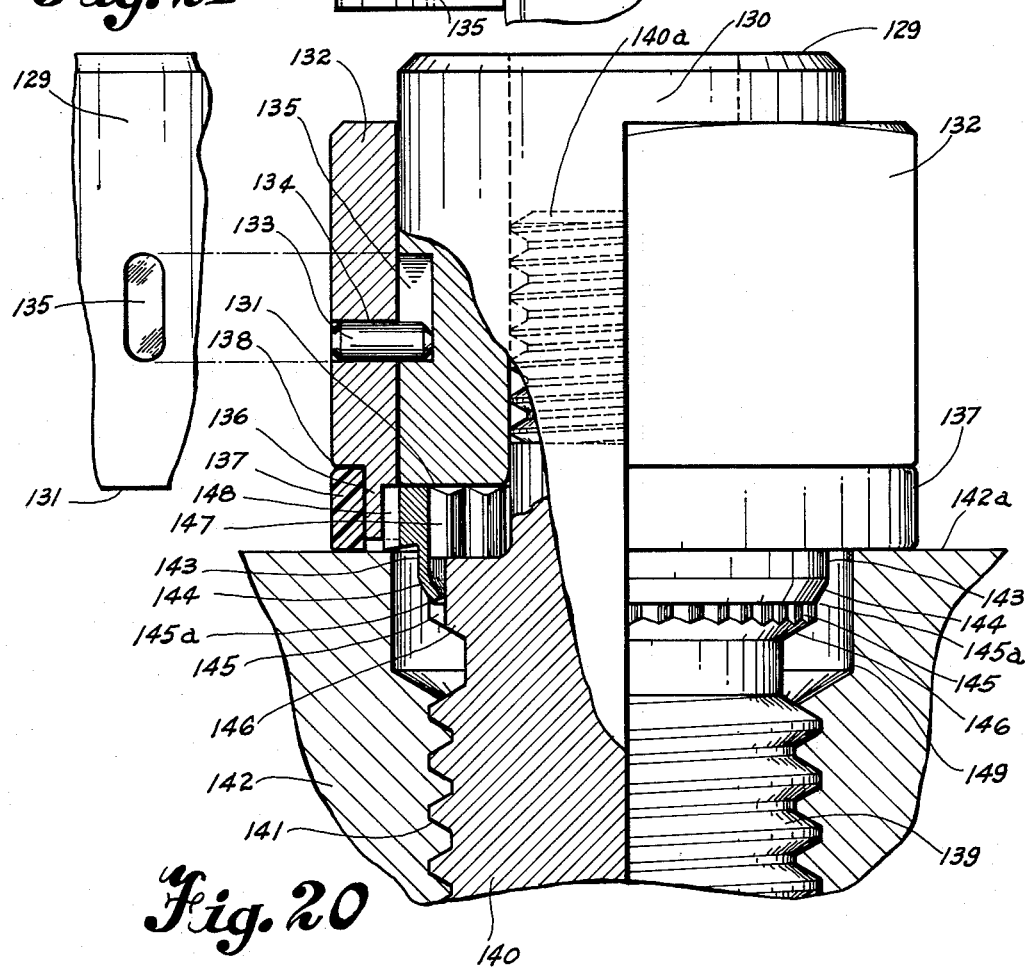

3,259,162
INSERT WITH FRICTIONALLY INTERLOCKED LOCKING RING

José Rosán, San Juan Capistrano, Calif., assignor to Rosan Engineering Corp., Newport Beach, Calif., a corporation of California
Filed Feb. 6, 1964, Ser. No. 342,954
6 Claims. (Cl. 151—41.73)

This invention relates to insert type fasteners designed for installation in bores of relatively softer material and to a method of using same. More particularly, the invention concerns an insert type fastener which includes a cylindrical body having a nondisengageable locking ring temporarily rigidly attached thereto adapted to lock said body against relative rotation with a workpiece and with a method of using such a fastener.

Heretofore, insert type fasteners with locking rings have generally been characterized by the fact that the fastener body and locking ring are supplied and installed as separate components. The fastener body is then conventionally installed in threaded engagement with a corresponding threaded bore of a workpiece and a separate ring is then aligned with the insert body and driven into a counterbore at one end of said bore to lock the fastener body against rotation in said bore. Because the locking rings and fastener bodies are provided as separate components, the stocking, assembly and installation of said separate components are expensive, time consuming and laborious tasks which materially increase the cost incident to the utilization of such fasteners.

Having the fastener bodies and locking rings as separate components has other important disadvantages, in that great care is necessary to insure that the locking ring is properly aligned with the fastener body and simultaneously properly aligned with the bore in the workpiece.

The present invention comprises a fastener having an externally threaded cylindrical body which is engageable with the correspondingly threaded bore of the workpiece and which is provided with an integral, outwardly projecting radial flange having a plurality of longitudinal serrations on the periphery thereof. The fastener body is engaged by an externally serrated locking ring which is also provided with a plurality of internal serrations that are adapted to engage the serrations carried by the fastener body.

Prior to the setting of the locking ring in its final operative locking position, the locking ring is maintained in a first inoperative position, wherein a portion of the internal serrations of the locking ring is in engagement with the serrations provided by the serrated body flange. The locking ring is maintained in this first inoperative position by a temporary securement means which creates a frictional interlock between the locking ring and the fastener body, thereby providing an axially displaceable locking ring which is simultaneously in preset alignment with the fastener body and the bore of the workpiece. Various expedients can be utilized to create the frictional interlock between the locking ring and the fastener body, along them being displaceable spheroidal bodies, displaceable rings and bands and interference fits between the fastener body and the locking ring.

The various expedients utilized creating the interlock are adapted to maintain the locking ring in a first inoperative position during the first phase of installation and permit said ring to be axially displaced into a second operative position when the locking ring is subjected to an axial force of sufficient magnitude to cause said displacement thereof from the first to second position.

Accordingly, the principal object of the invention is to provide an improved, simple, self-contained fastener of inexpensive construction, having a locking ring in simultaneous prealigned relationship with the fastener body and workpiece bore and capable of being installed and locked into place by relatively inexpensive tools.

Another object of the invention is to provide a fastener having a locking ring mounted thereupon, wherein said ring is temporarily maintained in a first inoperative position by securement means which creates an interlock between said locking ring and the fastener body, so that a single self-contained fastener is provided.

An additional object of the invention is to provide a fastener of the aforementioned character, wherein the securement means utilized to create the frictional interlock between the locking ring and the fastener body is comprised of a displaceable locking element interposed between said locking ring and said body.

A further object of the invention is to provide a fastener of the aforementioned character which has locating or stop means on the fastener body adapted to accurately locate the locking ring in a predetermined first inoperative position upon said fastener body during the assembly of the locking ring and fastener body.

Another object of the invention is to provide a fastener which is provided with a temporarily rigidly secured locking ring, capable of having the fastener body stationary and unaffected while the locking ring is embedded into locking position.

A still further object of the invention is to provide a fastener of the aforementioned character, embodying a stud.

Another object of the invention is to provide a simple and inexpensive wrenching tool for installing a fastener having the aforementioned characteristics.

Another object of the invention is to provide a driving tool for installing a fastener having the aforementioned characteristics.

A further object of the invention is to provide a composite tool adapted to wrench and drive a fastener of the invention having the aforementioned characteristics.

Still another object of the invention is to provide a method of using a fastener having a body provided with a temporarily rigidly secured locking ring in a first inoperative position.

Other objects and advantages of the invention will become apparent from the following descriptions taken in conjunction with the accompanying drawings, in which:

FIG. 1 is an elevational view, partly in section, of a stud fastener embodying the principles of the present invention wherein the securing means which creates the interlock between the locking ring and the insert body is a split band hoop and illustrates the fastener prior to locating the locking ring on the body thereof, and showing the split band hoop and locking ring prior to interlocked engagement with the fastener body;

FIG. 6 is an enlarged plan view of a securement element which is comprised of a split wire ring;

FIG. 7 is an enlarged sectional view of the wire type securement element of FIG. 6;

FIG. 8 is a greatly enlarged, partially fragmentary plan view of a stud type fastener, illustrating the securement element of FIGS. 6 and 7 in interlocked disposition between the locking ring and the fastener body;

FIG. 9 is an enlarged isometric view illustrating another type of securement means consisting of a split ring having external serrations on the periphery thereof, said serrations being adapted to engage the internal serrations of the locking ring;

Figure 5:
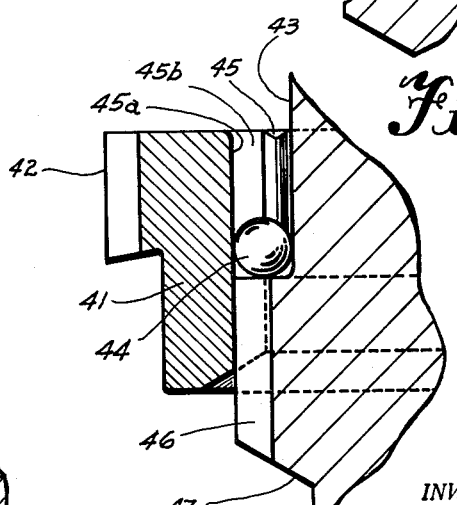
FIG. 5 is substantially the same view as FIG. 4, showing another embodiment of the invention wherein the frictional interlock between the locking ring and flange body is provided by spheroidal bodies.

FIG. 10 is a greatly enlarged fragmentary, sectional view showing a fastener fully threaded in a counterbored bore in a workpiece, having the locking ring thereof disposed in a first inoperative position prior to locking the fastener by virtue of a securement means consisting of a deformed portion of the locking ring frictionally coacting with the body of the fastener and being maintained in a predetermined first inoperative position by stop means located on the fastener body;

FIG. 11 is substantially the same view as FIG. 10, but, in addition, illustrates an enlarged fragmentary sectional view of a wrenching tool positioned to install the locking ring shown in FIG. 10 into engagement with the fastener;

FIG. 12 is a perspective view of the wrenching tool of FIG. 11 showing the nylon stop disassembled from the shoulder of the tool body;

FIG. 13 illustrates an enlarged fragmentary, partly elevational, partly sectional view of a stud type fastener embodying the principles of the invention, wherein the securement means is comprised of a plurality of spheres as shown in FIG. 5, and wherein the locking ring is disposed in a first inoperative position and shows an external wrenching tool positioned in association with the fastener after having completed the first installation phase;

FIG. 14 is substantially the same view as FIG. 13, except that a driving tool is shown positioned prior to driving the locking ring from the first inoperative position into a second operative or permanently locked position;

FIG. 15 is substantially the same view as FIG. 14, except that the driving tool is shown positioned in association with the insert after driving the locking ring into a second operative or permanently locked position;

FIG. 16 is an enlarged fragmentary, sectional view of a tubular insert type fastener embodying the principles of the present invention in which the securement means is comprised of a deformed portion of the locking ring frictionally coacting with the body of the fastener and shows a driving tool positioned after having driven the locking ring into a second operative position;

FIG. 17 is a greatly enlarged fragmentary, sectional view of a fastener embodying the principles of the invention showing a combined wrenching and driving tool positioned in association with a fastener having an internal bore wherein the locking ring is in the first inoperative position;

FIG. 18 is a greatly enlarged fragmentary view showing the keyway guide provided by the body of the driving portion of the combined tool of FIG. 17;

FIG. 19 is a greatly enlarged plan view of a quarter section of the combined wrenching and driving tool of FIG. 17, illustrating the hexagon configuration of the wrenching tool portion of the combined tool;

FIG. 20 is a greatly enlarged fragmentary, sectional view of a fastener embodying the principles of the invention showing a combined wrenching and driving tool positioned in association with the fastener wherein the locking ring is in the first inoperative position;

FIG. 21 is a greatly enlarged fragmentary view showing the keyway guide provided by the body of the driving portion of the combined tool of FIG. 20;

FIG. 22 is a greatly enlarged plan view of a quarter section of the combined wrenching and driving tool of FIG. 20 illustrating the hexagon configuration of the wrenching tool portion of the combined tool.

Figure 1:
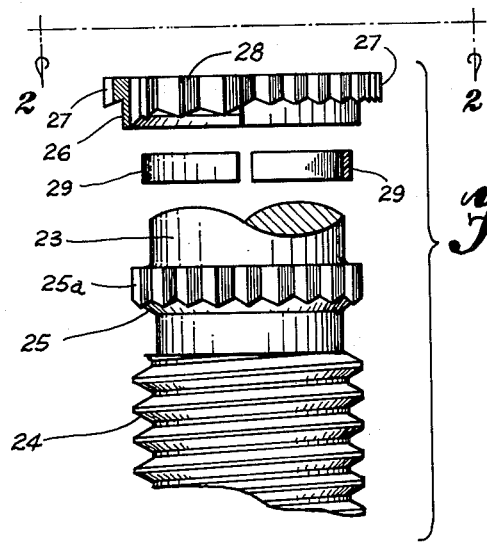

Referring more particularly to FIG. 1, numeral 23 designates the fastener body having a threaded portion 24 and a serrated flange 25. As illustrated, the locking ring 26 is provided with external serrations 27 which are adapted to press into the surface of a workpiece when disposed from a temporarily rigidly secured inoperative position to an operative or permanently locked position. Locking ring 26 is also provided with internal serrations 28 which are adapted to engage with serrations 25a carried by flange 25. The means for obtaining a temporary frictional interlock between the locking ring 26 and insert body 23 is illustrated in this figure as a split band hoop consisting of two separate semicircular segments 29.

Figure 2:
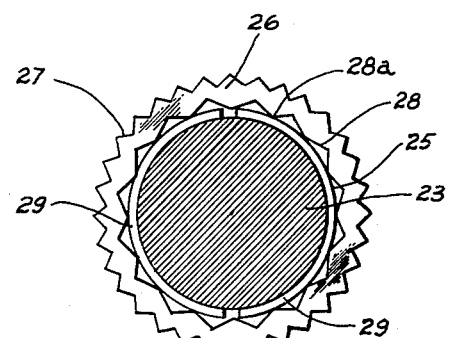
FIG. 2 is a plan view of the stud fastener illustrated in FIG. 1, but after assembly, taken on the line 2—2 of FIG. 1.

FIG. 2 is a plan view taken on the line 2—2 of FIG. 1 after the separate components of the fastener have been assembled showing the split band hoop segments 29 interposed between the surface of fastener body 23 and the apices 28a of the internal serrations 28 carried by locking ring 26, thereby maintaining the locking ring 26 temporarily rigidly secured in a first inoperative position.

Figure 3:
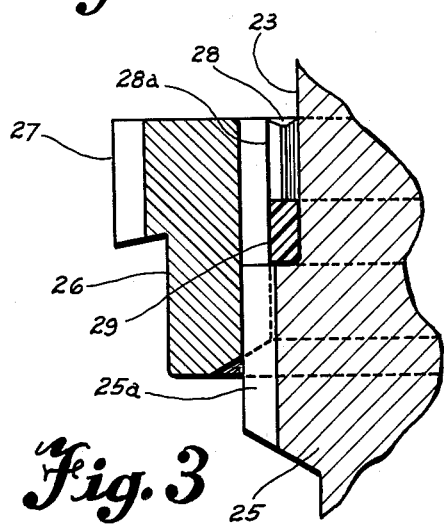
FIG. 3 is a greatly enlarged fragmentary, vertical, sectional view of an embodiment of the invention showing the locking ring interlocked in the first inoperative position, said interlock being provided by a split band hoop.

A greatly enlarged fragmentary sectional view is shown in FIG. 3 illustrating the interpositioning of the band hoop segments 29 between the external surface of fastener body 23 and the apices 28a of serrations 28 carried by locking ring 26, thereby maintaining locking ring 26 temporarily rigidly secured to serrated flange 25 in a first inoperative position. It should be noted that internal serrations 28 provided by locking ring 26 are in partial engagement with serrations 25a which are provided about the periphery of flange 25 so that during axial displacement of locking ring 26 into its operative or permanently locked position, locking ring 26 is maintained in simultaneous alignment with body portion 23 and the bore in the workpiece in which the fastener is being installed.

Figure 4:
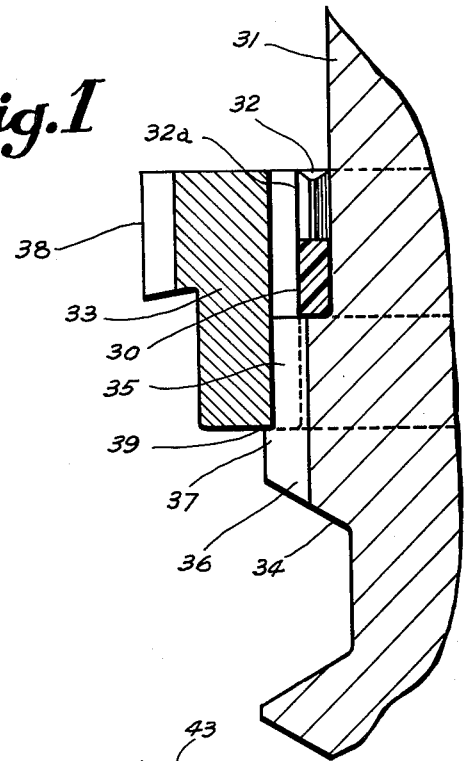
FIG. 4 is substantially the same view as FIG. 3, except that a stop means is provided by said fastener body to locate the locking ring in a predetermined first inoperative position.

FIG. 4 illustrates another embodiment of the present invention, wherein semicircular segments of a split band hoop 30 are interposed between the external surface of fastener body 31 and the apices 32a of internal serrations 32 carried by locking ring 33. Body 31 is provided with an annular flange 34, which, in turn, is provided with adjacent peripheral serrations 35 and 36. The diameter across the apices of the serrations 36 is greater than the diameter across the apices of the serrations 35, thereby providing a seat or shoulder 37 upon which locking ring 33 is seated in a predetermined position. Thus, the combination of the interposed band hoop segment 30 and seat 37 coact to maintain the locking ring 33 temporarily, rigidly interlocked in a predetermined first inoperative position. When locking ring 33 of the fastener of FIG. 4 is axially disposed into its operative or permanently locked position, serrations 38 are embedded into the surface of the workpiece and the leading edge 39 of locking ring 33 will act as a cutting or broaching edge which shears away and removes shoulder 37. Thus, when locking ring 33 is in its operative or permanently locked position, by virtue of the shearing process just described, serrations 35 and 36 are then of the same diameter across the apices thereof, and are fully engaged with the internal serrations 32 carried by locking ring 33.

FIG. 5 is another embodiment of the invention in which locking ring 41 is provided with external serrations 42, and is maintained in a temporarily rigidly secured inoperative position in relation to fastener body 43 by the interposition of spheroidal body 44 between the body 43 and the root 45a and side walls 45b of internal serrations 45 carried by locking ring 41. Again, it should be noted that internal serrations 45 of locking ring 41 are partially engaged with serrations 46 provided by peripheral flange 47 for the reasons stated with respect to FIG. 3.

FIG. 6 is a plan view of a securement means which is comprised of a wire ring 48, having a split 48a. A cross sectional view of split ring 48 is shown in FIG. 7.

FIG. 8 is a greatly enlarged, partially fragmentary plan view of a fastener showing the securement element 48 of FIGS. 6 and 7 interposed between the body 49 of the fastener and apices 50a of internal serrations 50 provided by locking ring 51. Locking ring 51, which is provided with internal serrations 52, is shown in a first inoperative position temporarily rigidly interlocked with body 49 by securement element 48. Again, as in the previously described embodiments, internal serrations 50 carried by locking ring 51 are partially engaged with serrations 53 carried by an annular flange (not visible) provided by fastener body 49.

FIG. 9 illustrates another securement means consisting of two semicircular segments 54, the external peripheries of which are provided with serrations 55 and the internal walls 56 thereof are defined by chordal arcs. Securement segments 54 are adapted to be interposed between the body of a fastener and the internal serrations of a locking ring, whereby the surfaces of internal walls 56 of segments 54 are seated against the external surface of the fastener body and the external serrations 55 of said segments 54 are interfitted with the internal serrations of an associated locking ring, thereby maintaining the locking ring in a temporarily rigidly secured first inoperative position.

FIG. 10 illustrates another embodiment of the invention wherein locking ring 57 is temporarily rigidly secured to flange 58 provided by body 59 by press fitting deformed portion 60 of locking ring 57 onto serrations 61 carried by said flange 58. Locking ring 57 is press fitted onto serrations 61 for only a part of the length of the serrations 61, and is seated on a slight annular shoulder 62. When locking ring 57 is axially displaced from its temporarily rigidly secured inoperative position to its operative or permanently locked position, the serrations 63 carried thereby are embedded in the surface 64a of workpiece 64. It should be noted that during the axial displacement of locking ring 57, internal serrations 65 carried thereby are in constant engagement with serrations 61 of flange 58 so as to maintain locking ring 57 in simultaneous alignment with body 59 of the fastener and bore 66 of the workpiece. As illustrated, the fastener body 59 is provided with threads 67 on a portion thereof, said threads being in threaded engagement with bore 66. Locking ring 57 is shown disposed in counterbore 68 of bore 66, said counterbore 68 having a beveled wall portion 69 at the bottom thereof.

FIG. 11 shows the fastener described in FIG. 10, wherein locking ring 57 is temporarily rigidly secured to flange 58 of fastener body 59 and wherein body 59 is in threaded engagement with bore 66 of workpiece 64. Wrenching tool 70, which is adapted to thread the fastener into the bore, is shown in engagement with the fastener after having fully threaded fastener body 59 into bore 66 of workpiece 64. Tool 70 is provided with a cylindrical cavity 71 and an axial annular projection 72 which has a plurality of longitudinal serrations 73 around the periphery thereof. Serrations 73 are adapted to engage internal serrations 65 of locking ring 57 to provide a driving means for threading the insert into the bore of the workpiece. Tool 70 is further provided with annular shoulder 74 against which abuts stop ring 75. Stop ring 75 is of a predetermined height to insure that the fastener is installed to a specific depth in the bore of the workpiece. As is illustrated in FIG. 11, the length of the stop ring 75 axially extends to at least the bottom surface of serrations 63 of the locking ring. If any portion of the serrations 63 of locking ring 57 project below the lower edge of stop ring 75, when the fastener is threaded into bore 66 by wrenching tool 70, the bottom edge of serrations 63 would score the surface 64a of workpiece 64 in the area adjacent the counterbore 68. Because of the interlock existing between locking ring 57 and the fastener body 59, by rotating tool 70 which has its external serrations 73 engaged with internal serrations 65 of locking ring 57, the entire fastener is rotated as an integral unit and thereby threaded into bore 66 of workpiece 64.

FIG. 12 is a perspective view of the tool described in conjunction with FIG. 11, but showing stop ring 75 disassembled from shoulder 74 of tool 70. FIG. 12 further shows wrench engaging means comprised of a rectangular projection 76.

FIG. 13 is a partly elevational, partly sectional view of a fastener embodying the principles of the present invention wherein the securement means for temporarily rigidly securing the locking ring to the fastener body is comprised of a plurality of spheres as illustrated in FIG. 5. The fastener body 43 in FIG. 13 is provided with a threaded portion 77, an integral radial flange 47 which is provided with longitudinal peripheral serrations 46. Spheres 44 are interposed between body 43 and locking ring 41 thereby frictionally temporarily interlocking said locking ring 41 to body 43 in a first inoperative position. It should be noted here, as is the case with respect to the device shown in FIG. 5, spheres 44 are interposed between the surface of body 43 and the side walls and root cavities of internal serrations 45 of locking ring 41. Internal serrations 45 of locking ring 41 are in partial engagement with external serrations 46 carried by flange 47 so as to maintain locking ring 41 in simultaneous alignment with the insert body 43, counterbore 80 and bore 78 of workpiece 79.

Wrenching tool 81 is also illustrated in FIG. 13 and is shown in engagement with the fastener after having fully threaded said fastener into bore 78. Tool 81 is provided with an internal cavity 82 adapted to accommodate body 43 of the fastener and is further provided with a longitudinally extending annular projection 83. Annular projection 83 is further provided with internal peripheral serrations 84 which are adapted to engage the external serrations 42 carried by locking ring 41. Because of the interlock existing between locking ring 41 and the fastener body 43 provided by spheres 44 interposed between said locking ring 41 and the surface of body 43, by rotating tool 81 which has its internal serrations 84 engaged with external serrations 42 of locking ring 41, the entire fastener is rotated as an integral unit and thereby threaded into the bore 78 of the workpiece 79.

FIG. 14 illustrates the fastener shown in FIG. 13, except that FIG. 14 additionally shows driving tool 85 positioned on locking ring 41 of the fastener prior to locking same into the surface 79a of workpiece 79. Driving tool 85 is provided with an internal cavity 86 which is adapted to receive body 43 of the fastener. In addition, tool 85 is also provided with a longitudinally extending annular projection 87 which is adapted to engage the top surface of locking ring 41 and thereby drive same into surface 79a by the application of an axial force to tool 85. Annular projection 87 has an inner diameter at least as great as the diameter across the root of the internal serrations 45 of locking ring 41, thereby creating an annular cavity 88 which is adapted to accommodate the spheroidal securement means 44 which will be expelled when locking ring 41 is fully driven into its operative or permanently locked position into workpiece 79 as shown in FIG. 15. Annular ring 89 is secured to tool 85 adjacent longitudinal annular projection 87 and abuts against annular shoulder 90 carried by tool 85 and is adapted to act as a stop means at a predetermined position when locking ring 41 is fully driven into workpiece 79.

FIG. 15 illustrates the fastener and driving tool shown in FIG. 14, but with the locking ring 41 fully driven into its operative or permanently locked position into workpiece 79. In this figure, the spheroidal means 44 are shown accommodated in annular cavity 88 after having been expelled during the driving operation and would normally be discarded. It will be understood that although driving tool 85 is described in conjunction with a temporary securement means consisting of spheroids, tool 85 may be utilized with all of the embodiments of the present invention herein described.

FIG. 16 illustrates another type of fastener embodying the principles of the present invention and also illustrates another embodiment of the driving tool. In FIG. 16 the insert is comprised of tubular body 91 provided with an internally threaded bore 92 and external threads 93, the latter of which are adapted to engage internally threaded bore 94 of workpiece 95. Body 91 has an annular flanged collar 96 which is provided with external peripheral serrations 97. Locking ring 98, which is similar to that shown in FIGS. 10 and 11, is provided with deformed portion 99. As was the case with deformed portion 60 in FIG. 10, prior to being fully driven into its operative or permanently locked position, deformed portion 99 is seated on an annular shoulder (not shown) similar to shoulder 62 as illustrated in FIGS. 10 and 11. Locking ring 98 is shown in FIG. 16 as having the serrations 100 thereof fully embedded into workpiece 95 thereby permanently locking the insert into bore 94 of workpiece 95. Driving tool 101 is shown positioned over insert 91 and seated against surface 95a of workpiece 95 after having fully driven locking ring 100 into its operative or permanently locked position. Tool 101 is provided with an axially extending portion 102 outwardly projecting from body 103. Projecting portion 102 is adapted to be accommodated by internally threaded bore 92 of insert 91 so as to provide lateral support to the insert wall and thereby prevent any collapsing thereof when driving the locking ring 98 into the workpiece 95. Body 103 has a shoulder 106 and a second shoulder 104, the latter providing the driving surface that contacts and axially displaces the locking ring 98 into the workpiece 95. Annular ring 105, which acts as a stop means, circumferentially surrounds shoulder 104, abuts against annular shoulder 106 carried by body 103 and is adapted to fit against surface 95a of workpiece 95 when the fastener is fully threaded into bore 94 of the workpiece.

The combination wrenching and driving tool shown in FIG. 17 is comprised of a driving portion which has a body 107. Body 107 is provided with a portion 108 longitudinally projecting from the axis thereof, and is further provided with an annular shoulder 109 which carries driving surface 109a. The wrenching portion of the combined driving and wrenching tool is comprised of a wrenching sleeve 110 which is adapted to receive driving portion 107. Sleeve 110 is also provided with an annular projection 114 having internal serrations (not visible) and is secured to driving body 107 by pin 111 which is fitted into aperture 112 carried by sleeve 110. Said pin 111 extends into key cavity 113 provided by driving body 107. The configuration of key cavity 113 is such that when pin 111 projects therein, relative rotational movement between wrenching sleeve 110 and driving body 107 is prohibited, yet relative slidable movement is permitted in a longitudinal direction. Thus, when wrenching sleeve 110 is rotated, the combined driving and wrenching tool rotates as a single unit. However, when axial force is applied to the driving tool to drive body 107, the wrenching portion 110 remains stationary while driving body 107 is axially displaced independently of said wrenching sleeve 110. Stop ring 115, which abuts against shoulder 116 provided by wrenching sleeve 110, insures the installation of the fastener to a consistent predetermined depth in the bore 119 of workpiece 120.

The insert illustrated in FIG. 17 has a body 118 provided with external threads 117 threaded into threaded bore cavity 119 of workpiece 120. The securement means by which locking ring 121 is temporarily rigidly secured to fastener body 118 is similar to that shown in FIG. 16 in which locking ring 121 has a deformed portion 122 which is seated upon shoulder 123a provided by peripheral serrations 123 carried by annular flange 124 of body 118. Locking ring 121 is provided with internal serrations 125 which are adapted to engage flange serrations 123 and is also provided with external peripheral serrations 126 which are adapted to engage the internal serrations (not visible) carried by annular projection 114 of sleeve 110.

When the combined driving and wrenching tool is used, the serrations carried by projection 114 of wrenching sleeve 110 are engaged with the external serrations 126, provided by locking ring 121. Since locking ring 121 in its inoperative position is temporarily rigidly secured to flange 124 of body 118 of the insert, the insert body 118 and locking ring 121 would rotate as a single, integral unit into threaded bore 119 of workpiece 120. When stop ring 115, which abuts against shoulder 116 of wrenching sleeve 110, comes into contact with the surface 120a of workpiece 120, insert body 118 is fully seated and rotation thereof ceases. After fully seating insert 118 into bore 119 of workpiece 120, an axial force is applied to driving body 107 thereby axially displacing locking ring 121 from its temporarily rigidly secured inoperative position to an operative or permanently locked position. This is achieved by a broaching process, which results from the application of an axial force on locking ring 121 so that deformed portion 122 thereof shears away seat 123a, and simultaneously drives external serrations 126 of locking ring 121 into workpiece material 120 in the vicinity of counterbore 127 in said workpiece. Internal serrations 125 of locking ring 121 not only insure proper alignment of locking ring 121 relative to counterbore 127 and insert body 118 during the driving operation, but also coact with external serrations 123 provided by flange 124 of insert body 118 so as to prevent relative rotation thereof. Since the insert illustrated in FIG. 17 is also provided with an internally threaded bore 128, projection portion 108 provided by body 107 of the driving portion of the tool is adapted to fit therein, thereby not only insuring proper alignment of the driving tool relative to the insert body 118, but also preventing the insert body 118 from laterally collapsing when an axial force is applied in driving the locking ring 121 into work piece 120.

FIG. 18 is a fragmentary elevational view of body 107 of the driving tool showing the configuration of key slot 113 provided thereby.

FIG. 19 is a quarter sectional plan view of the combined driving and wrenching tool and illustrates the relationship of the driving tool portion to the wrenching tool portion. FIG. 19 also shows the external surface of the sleeve 110 as having a hexagonal configuration whereby a wrench or the like may be applied to rotate the combined driving and wrenching tool.

FIG. 20 illustrates a modified combined driving and wrenching tool and is shown engaged with a stud type fastener. The fastener shown has a body 140 provided with external threads 139 which are adapted to engage threaded bore 141 of workpiece 142 and is further provided with externally threaded body portion 140a. The driving tool portion of the combined driving and wrenching tool is comprised of body portion 129 having an internal cavity 130 which is adapted to receive threaded body portion 140a of body 140. Driving body 129 is also provided with an annular driving surface 131 which is shown positioned upon locking ring 143 of the fastener just prior to axially displacing said locking ring 143 from its temporarily rigidly secured inoperative position to an operative or fully locked position.

Wrenching sleeve 132 is provided with an annular longitudinal projection 136 having internal serrations (not visible) which are adapted to engage external peripheral serrations 148 carried by locking ring 143. Wrenching sleeve 132 is also provided with an annular shoulder 138 against which abuts stop ring 137 which is secured thereto. Wrenching sleeve 132 is engaged with driving body 129 by the same means described with respect to the combined driving and wrenching tool of FIG. 17. That is, pin 133 which is carried by wrenching sleeve 132 is fitted into aperture 134 therein and extends into key cavity 135 provided by the driving body 129. The temporary securement means illustrated in FIG. 20 is the same as that illustrated in FIG. 17, with the exception that in FIG. 20 reference numeral 144 designates the deformed portion of the locking ring 143 and 147 designates internal serrations carried by locking ring 143, while numerals 142a and 149 designate the surface and counterbore, respectively, of workpiece 142.

The insert illustrated in FIG. 20 is also provided with annular flange 146 which carries peripheral serrations 145. Said serrations 145 are provided with an annular seat 145a upon which is positioned deformed portion 144 of locking ring 143. As was the case with the locking ring illustrated in FIGS. 16 and 17, the deformed portion 144 of locking ring 143 is press fitted onto external serrations 145. The operation of the combined wrenching and driving tool illustrated in FIG. 20 is substantially the same as described with respect to the device of FIG. 17.

FIG. 21 is a fragmentary, elevational view showing the configuration of the key cavity provided by driving body 129. FIG. 22 is a quarter sectional plan view of the combined driving and wrenching tool shown in FIG. 20 and illustrates the interrelationship of the driving tool body 129 and wrenching sleeve 132 and externally threaded portion 140a of insert body 140.

FIG. 22 also illustrates the external surface of sleeve 132 as having a hexagonal configuration which is adapted to be engaged by a wrench or the like to rotate the combined driving and wrenching tool.

While several embodiments of the invention, their method of use and tools for the installation of same have been described, it is, of course, understood that the particular embodiments of the invention herein disclosed are for illustrative purposes only, and that various changes may be made therein without departing from the principles of the invention or the scope of the annexed claims.

I claim:

1. In a fastener adapted to be installed in a bore in a workpiece, the combination of:
    a cylindrical body;
    an integral, radial flange projecting from said body, said flange provided with a plurality of longitudinal serrations on the outer periphery thereof;
    a locking ring provided with a plurality of serrations on the outer periphery thereof and a plurality of serrations on the internal periphery thereof, said internal serrations being engaged with the serrations of said flange;
    means nonintegral to either of said locking ring and said body, said means being a separate frictional element interposed between said locking ring and said body for temporarily rigidly securing said locking ring to said flange.

2. In a fastener adapted to be installed in a bore in a workpiece, the combination of:
    a cylindrical body;
    an integral, radial flange projecting from said body, said flange provided with a plurality of longitudinal serrations on the outer periphery thereof;
    a locking ring provided with a plurality of serrations on the outer periphery thereof and a plurality of serrations on the internal periphery thereof, said internal serrations being engaged with the serrations of said flange;
    nonintegral frictional means for temporarily rigidly securing said locking ring to said flange, comprising a split band hoop interposed between the arcuate plane defined by the crests of the internal serrations of the locking ring and the cylindrical body of the fastener, said split band hoop being concentrically positioned and radially spaced from the axis of said fastener and having a radial thickness slightly greater than the radial distance between said internal serrations carried by said locking ring and the cylindrical body of said fastener so as to temporarily frictionally bind the same together.

3. In a fastener adapted to be installed in a bore in a workpiece, the combination of:
    a cylindrical body;
    an integral, radial flange projecting from said body, said flange provided with a plurality of longitudinal serrations on the outer periphery thereof;
    a locking ring provided with a plurality of serrations on the outer periphery thereof and a plurality of serrations on the internal periphery thereof, said internal serrations being engaged with the serrations of said flange;
    nonintegral frictional means for temporarily rigidly securing said locking ring to said flange, comprising a plurality of spheres interposed between the arcuate plane defined by the crests of the internal serrations of the locking ring and the cylindrical body of the fastener, said spheres being concentrically positioned and radially spaced from the axis of said fastener and having a diameter slightly greater than the radial distance between said internal serrations carried by said locking ring and the cylindrical body of said fastener so as to temporarily frictionally bind the same together.

4. In a fastener adapted to be installed in a bore in a workpiece, the combination of:
    a cylindrical body;
    an integral, radial flange projecting from said body, said flange provided with a plurality of longitudinal serrations on the outer periphery thereof;
    a locking ring provided with a plurality of serrations on the outer periphery thereof and a plurality of serrations on the internal periphery thereof, said internal serrations being engaged with the serrations of said flange;
    nonintegral frictional means for temporarily rigidly securing said locking ring to said flange, comprising a wire ring interposed between the arcuate plane defined by the crests of the internal serrations of the locking ring and the cylindrical body of the fastener, said wire ring being concentrically positioned and radially spaced from the axis of said fastener and having the cross sectional diameter thereof slightly greater than the radial distance between said internal serrations carried by said locking ring and the cylindrical body of said fastener so as to temporarily frictionally bind the same together.

5. In a fastener adapted to be installed in a bore in a workpiece, the combination of:
    a cylindrical body;
    an integral, radial flange projecting from said body, said flange provided with a plurality of longitudinal serrations on the outer periphery thereof;
    a locking ring provided with a plurality of serrations on the outer periphery thereof and a plurality of serrations on the internal periphery thereof, said internal serrations being engaged with the serrations of said flange;
    nonintegral frictional means for temporarily rigidly securing said locking ring to said flange, comprising a split ring interposed between the internal serrations of the locking ring and the cylindrical body of the fastener, said split ring having serrations on the outer periphery thereof, said serrations on said split ring being interengaged with the internal serrations of the locking ring, said split ring being concentrically positioned and radially spaced from the axis of said fastener, and having a radial distance between the arcuate plane defined by the points of contact of the interengaged locking ring serrations and split ring serrations and the innermost arcuate surface of said ring slightly greater than the radial distance between said arcuate plane defined by the points of contact of said interengaged locking ring serrations and split ring serrations and the cylindrical fastener body so as to temporarily frictionally bind the same together.

6. In a fastener adapted to be installed in a bore in a workpiece, the combination of:
- a cylindrical body;
- an integral radial flange projecting from said body, said flange provided with a plurality of serrations on the outer periphery thereof, a portion of the crests of serrations being truncated so as to form an annular shoulder;
- a locking ring provided with a plurality of serrations on the outer periphery thereof and a plurality of serrations on the internal periphery thereof, said internal serrations being interengaged with the serrations of said flange, one edge of said locking ring being circumferentially depressed inwardly so that the roots of said depressed portion seat upon said annular shoulder and the crests of said depressed portion engage the roots of said flange serrations, the arcuate root diameter and the arcuate crest diameter of the serrations of said depressed portion being slightly smaller than the arcuate crest diameter and arcuate root diameter, respectively, of said flange serrations so as to temporarily frictionally bind the locking ring and flange together, thereby providing nonintegral means for temporarily rigidly securing said locking ring to said flange.

References Cited by the Examiner

UNITED STATES PATENTS

| | | | |
|---|---|---|---|
| 2,400,318 | 5/1946 | Rosan | 151—41.73 |
| 2,670,644 | 3/1954 | Du Sell. | |
| 2,790,342 | 4/1957 | Rosan. | |
| 2,782,827 | 2/1957 | Rosan | 151—41.73 |
| 3,091,842 | 6/1963 | Creamer | 29—432 |
| 3,124,189 | 3/1964 | Dietlein | 151—41.73 |
| 3,130,765 | 4/1964 | Neuschotz | 151—23 |
| 3,157,942 | 11/1964 | MacLean | 29—432 |
| 3,179,144 | 4/1965 | Brown | 151—41.73 |
| 3,198,231 | 8/1965 | Bisbing | 151—41.73 |

CARL W. TOMLIN, *Primary Examiner.*

M. PARSONS, JR., *Assistant Examiner.*